(12) United States Patent
Xu et al.

(10) Patent No.: US 9,313,237 B2
(45) Date of Patent: Apr. 12, 2016

(54) METHOD, APPARATUS, AND COMMUNICATION SYSTEM FOR ALLOCATING AND MANAGING VOICE CHANNELS

(71) Applicant: TENCENT TECHNOLOGY (SHENZHEN) COMPANY LIMITED, Shenzhen (CN)

(72) Inventors: Xiaomin Xu, Shenzhen (CN); Kun Guan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 57 days.

(21) Appl. No.: 14/301,371

(22) Filed: Jun. 11, 2014

(65) Prior Publication Data
US 2014/0341211 A1    Nov. 20, 2014

Related U.S. Application Data

(63) Continuation of application No. PCT/CN2013/089880, filed on Dec. 18, 2013.

(30) Foreign Application Priority Data

May 15, 2013  (CN) .................. 2013 1 01796061

(51) Int. Cl.
*H04L 29/06*        (2006.01)
(52) U.S. Cl.
CPC ............ *H04L 65/1069* (2013.01); *H04L 65/80* (2013.01)

(58) Field of Classification Search
CPC .. H04L 65/1069; H04L 65/80; H04W 76/028
See application file for complete search history.

(56) References Cited

U.S. PATENT DOCUMENTS 5,754,784 A  *  5/1998  Garland  .................. H04L 29/06
                                                                348/E5.008
2004/0125800 A1   7/2004  Zellner et al.
(Continued)

FOREIGN PATENT DOCUMENTS

CN        1719810 A       1/2006
CN      101175322 A   *   5/2008
(Continued)

OTHER PUBLICATIONS

The State Intellectual Property Office of the People's Republic of China (SIPO) Office Action 1 for 201310179606.1 Apr. 2, 2014.
(Continued)

*Primary Examiner* — Paul H Masur
(74) *Attorney, Agent, or Firm* — Anova Law Group, PLLC

(57) ABSTRACT

Methods, apparatus and communication systems for allocating and managing voice channels are provided. After receiving first voice data, a voice server can search for a voice channel corresponding to a first user of the first voice data. When successfully finding the first voice channel corresponding to the first user, the voice server can write the first voice data to the first voice channel. When successfully allocating a second voice channel that is currently already-timed-out to the first user, the voice server can write the first voice data to the second voice channel, and mark the second voice channel as assigned to the first user. Utilizing efficiency of the voice channels is therefore improved and deploying of hardware resources can be reduced.

12 Claims, 6 Drawing Sheets

(56) References Cited

U.S. PATENT DOCUMENTS

| | | | | |
|---|---|---|---|---|
| 2005/0265361 | A1* | 12/2005 | Quilty | H04L 29/06 370/401 |
| 2006/0210037 | A1* | 9/2006 | Olafsson | H04L 5/1438 379/93.34 |
| 2006/0215639 | A1* | 9/2006 | Inagi | H04L 29/06027 370/352 |
| 2011/0046698 | A1* | 2/2011 | Kivi | H04W 76/028 607/60 |
| 2011/0047260 | A1* | 2/2011 | Jlang | H04L 41/0659 709/223 |

FOREIGN PATENT DOCUMENTS

| | | |
|---|---|---|
| CN | 102076091 A | 5/2011 |
| CN | 103312907 A | 9/2013 |

OTHER PUBLICATIONS

The State Intellectual Property Office of the People's Republic of China (SIPO) Office Action 2 for 201310179606.1 Aug. 5, 2014.
The World Intellectual Property Organization (WIPO) International Search Report for PCT/CN2013/089880 Mar. 20, 2014.

* cited by examiner

METHOD, APPARATUS, AND COMMUNICATION SYSTEM FOR ALLOCATING AND MANAGING VOICE CHANNELS

CROSS-REFERENCES TO RELATED APPLICATIONS

This application is a continuation application of PCT Patent Application No. PCT/CN2013/089880, filed on Dec. 18, 2013, which claims priority to Chinese Patent Application No. 2013101796061, filed on May 15, 2013, the entire contents of which are incorporated herein by reference.

FIELD OF THE DISCLOSURE

The disclosure relates to the field of computer technology and, more particularly, relates to methods, apparatus and communication systems for allocating and managing voice channels.

BACKGROUND

Currently, voice chatting such as QQ voice chatting often uses a voice channel. A voice channel is a storage resource used to store voice data on a voice server. The voice channel can be used to record information including timestamp, identification information of a current user, etc. The voice chatting may include a specific mode, e.g., for talking in a queue or talking freely. Conventional voice servers allocate a number of voice channels the same as the number of the online voice users.

Because conventional voice server allocates voice channels with the same number as of the online voice users, the total number of the voice channels that can be provided by the voice server directly limits the maximum number of the online users that are allowed by the voice server. As such, in specific time slots or specific scenarios that a large amount of online users are included, a voice server has to provide more hardware resources so as to provide appropriate number of voice channels. Related cost is then greatly increased.

BRIEF SUMMARY OF THE DISCLOSURE

One aspect of the present disclosure includes a method for managing voice channels implemented by a voice server. The voice server receives first voice data and searches for a first voice channel corresponding to a first user of the first voice data. When failing to find the first voice channel corresponding to the first user, the voice server attempts to allocate a currently already-timed-out voice channel to the first user. When successfully allocating a second voice channel that is currently already-timed-out to the first user, the voice server writes the first voice data to the second voice channel and marks the second voice channel as assigned to the first user.

Another aspect of the present disclosure includes a voice server. The voice server includes a receiving module, a searching module, an allocating module, and a writing module. The receiving module is configured to receive first voice data. The searching module configured to search for a first voice channel corresponding to a first user of the first voice data. The allocating module is configured, when the searching module fails to find the first voice channel corresponding to the first user, to attempt to allocate a currently already-timed-out voice channel to the first user. The writing module is configured, when the allocating module successfully allocates a second voice channel that is currently already-timed-out to the first user, to write the first voice data to the second voice channel and to mark the second voice channel as assigned to the first user.

Another aspect of the present disclosure includes a communication system including a voice server interacting with a user terminal. The voice server is configured: to receive first voice data sent from the user terminal; to search for a first voice channel corresponding to a first user of the first voice data; when failing to find the first voice channel corresponding to the first user, to attempt to allocate a currently already-timed-out voice channel to the first user; and when successfully allocating a second voice channel that is currently already-timed-out to the first user, to write the first voice data to the second voice channel and to mark the second voice channel as assigned to the first user, wherein the user terminal is assigned to the first user.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Methods, apparatus, and communication systems for allocating and managing voice channels are provided, for example, as shown in FIGS. 1-7. Utilizing efficiency of the voice channels is therefore improved and deploying of hardware resources can be reduced. The disclosed methods, apparatus and systems can be implemented in a suitable environment and/or using a computer-based system.

Figure 8:
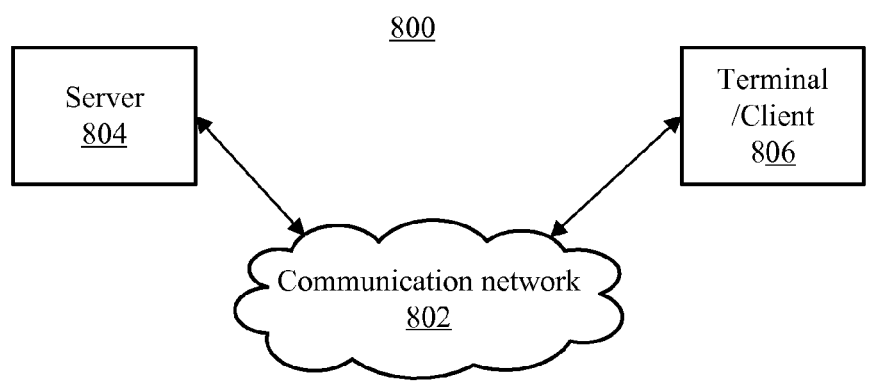
FIG. 8 depicts an exemplary environment incorporating certain disclosed embodiments.

For example, FIG. 8 depicts an exemplary environment 800 incorporating certain disclosed embodiments. As shown in FIG. 8, environment 800 may include a server 804, a terminal or a terminal 806, and/or a communication network 802. The server 804 and the client 806 may be coupled through the communication network 802 for information exchange, such as obtaining web data. Although only one terminal 806 and one server 804 are shown in the environment 800, any number of terminals 806 or servers 804 may be included, and other devices may also be included.

Communication network 802 may include any appropriate type of communication network for providing network connections to the server 804 and terminal 806 or among multiple servers 804 or terminals 806. For example, communication network 802 may include the Internet or other types of computer networks or telecommunication networks, either wired or wireless.

A terminal, as used herein, may refer to any appropriate user terminal with certain computing capabilities, such as a personal computer (PC), a work station computer, a handheld computing device (tablet), a smart phone or mobile phone, or any other user-side computing device. A server, as used herein, may refer to one or more server computers configured to provide certain server functionalities, such as database management and search engines. A server may also include one or more processors to execute computer programs in parallel. In one embodiment, the server can be used as a voice server as desired. Server 804 and/or terminal 806 may be implemented on any appropriate computing platform.

In an exemplary method for allocating and managing voice channels, a voice server can receive first voice data and search for a voice channel corresponding to a first user of the first voice data. When failing to find the voice channel corresponding to the first user, the voice server can attempt to allocate a currently already-timed-out voice channel to the first user. When successfully allocating a second voice channel that is currently already-timed-out to the first user, the voice server can write the first voice data to the second voice channel and mark the second voice channel as assigned to the first user.

Figure 1:
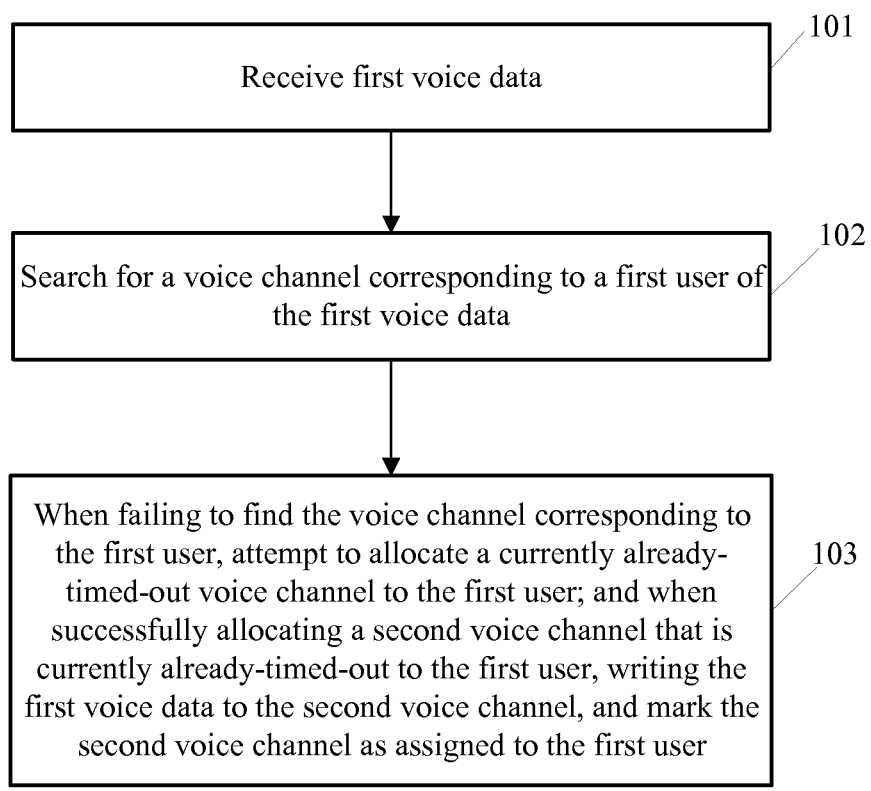
FIG. 1 is a flow chart of an exemplary method for allocating and managing voice channels in accordance with various embodiments.

FIG. 1 is a flow chart of an exemplary method for allocating and managing voice channels in accordance with various embodiments.

In Step 101, a voice server receives a first voice data.

For example, when a user terminal (e.g., a first user terminal) joins to a voice chat room for network chatting, the first user terminal can send some voice data (e.g., first voice data) to the voice server. The voice server can receive the first voice data from the first user terminal. The first user terminal that sends the first voice data belongs to a user (e.g., a first user).

As used herein, a user terminal may refer to any appropriate user terminal with certain computing capabilities including, for example, a personal computer (PC), a mobile phone, a personal digital processing device, or any other user-side terminal.

In Step 102, the voice server searches for a voice channel (e.g., a first voice channel) corresponding to a first user of the first voice data.

In various embodiments, the first voice data may contain user identification of the first user, and may further contain room identification of a voice chat room (e.g., a first voice chat room) of the first user. Of course, the voice server may store a correspondence relationship between the user identification of the first user and the room identification of the first voice chat room of the first user. Thus, the voice server can search the room identification of the voice chat room of the first user according to the user identification of the first user.

In various embodiments, before receiving the first voice data, the voice server may have allocated a voice channel to the first user, or may not have allocated the voice channel to the first user. For example, the voice server may not have allocated any voice channel to the first user all the time, or may have re-allocated the voice channel that is previously allocated to the first user to other users, or may re-set the voice channel that is previously allocated to the first user as an idle voice channel and the idle voice channel isn't assigned to any user.

The voice channel can be a storage resource (e.g., RAM) used to store voice data on a voice server. Information including, e.g., timestamp and/or user identification of a current user can be recorded in the voice channel.

In Step 103, when failing to find the first voice channel corresponding to the first user, the voice server attempts to allocate a currently already-timed-out voice channel to the first user. When successfully allocating a second voice channel that is currently already-timed-out to the first user, the voice server writes the first voice data to the second voice channel and marks the second voice channel as assigned to the first user.

In various embodiments, an already-timed-out voice channel may refer to a voice channel having a time expressed by a timestamp after a current time by a time length that is greater than a first time length threshold. The first time length threshold can be one second, two seconds, three seconds, or any time length set according to actual needs. The already-timed-out voice channel is often assigned to a user.

In various embodiments, when the first voice data is written into the second voice channel, a timestamp of the second voice channel can be further updated. The updated second voice channel can have a timestamp indicating a time as an updated current time. In various embodiments, when the voice server successfully finds the first voice channel corresponding to the first user, the first voice data can be written into the first voice channel.

In various embodiments, when the first voice data is written into the first voice channel, a timestamp of the first voice channel can be further updated. The updated first voice channel can have a timestamp indicating a time as an updated current time.

In various embodiments, the method for managing the voice channel further includes: when failing to find the first voice channel corresponding to the first user, attempting to allocate a currently idle voice channel to the first user. When successfully allocating to the first user a third voice channel that is currently idle, the voice server can write the first voice data to the third voice channel and mark the third voice channel as assigned to the first user (e.g., the voice server can write a user identification of the first user into the third voice channel). In addition, when failing to allocate the currently idle voice channel to the first user (e.g., no idle voice channel is currently available), the voice server can notify the first user of the failure to obtain the voice channel (e.g., by sending a notification message to notify the failure to obtain the voice channel to the first user terminal).

In various embodiments, prior to attempting to allocate the currently already-timed-out voice channel to the first user, the method further includes: when failing to find the voice channel corresponding to the first user, attempting to allocate a currently idle voice channel to the first user; when successfully allocating a third voice channel that is currently idle to the first user, writing the first voice data to the third voice channel and marking the third voice channel as assigned to the first user; and when failing to allocate a currently idle voice channel to the first user, attempting to perform the attempting step to allocate the currently already-timed-out voice channel to the first user; when successfully allocating a second voice channel that is currently already-timed-out to the first user, writing, by the voice server, the first voice data to the second voice channel and marking the second voice channel as assigned to the first user; and when failing to find the currently already-timed-out voice channel corresponding to the first user (e.g., no already-timed-out voice channels are currently available), notifying the first user of the failure to obtain the voice channel (e.g., by sending a notification message to notify the failure to obtain the voice channel to the first user terminal).

In various embodiments, when the first voice data is written to the third voice channel, a timestamp of the third voice channel can be further updated. The updated third voice channel can have a timestamp indicating a time as an updated current time. In some embodiments, when some voice data (e.g., the first voice data) is written into some voice channels, further, all timestamps of the voice channels can be further updated. The updated voice channel can have a timestamp indicating a time as an updated current time.

In various embodiments, the attempting step to allocate the currently already-timed-out voice channel for the first user can include: attempting to allocate a currently already-timed-out voice channel that is assigned to a first voice chat room or any other voice chat room, or that is never assigned to any voice chat room, to the first user. For example, the first user is assigned to the first voice chat room (which may currently have multiple users, e.g., about 20 to about 100 users, joined in for a network chatting). Each voice chat room (e.g., the first voice chat room) can contain voice channels in an amount (or a number) that is fixed or dynamic alterable.

In various embodiments, the method for managing the voice channel further includes: when a pre-determined channel re-setting condition is satisfied, re-setting a currently already-timed-out portion of the voice channel(s) or all of the voice channel(s) of the voice channel(s) as idle voice channel(s). For example, when a pre-determined channel re-setting condition is satisfied, the currently already-timed-out portion of the voice channel(s) or all of the voice channel(s) belonging to the first voice chat room (or other voice chat rooms) can be re-set as idle voice channel(s) of the first voice chat room (or other voice chat room(s) or none voice chat room).

In various embodiments, the pre-determined channel re-setting condition can be the any feasible conditions set according to actual application needs. For example, the pre-determined channel re-setting condition can contain at least one condition as follows: when the currently idle voice channels have a total number/amount less than a pre-set first threshold value (e.g., about 10 or any other value); when the currently idle voice channels have a number with a ratio over a total number of the voice channels and the ratio is less than a preset second threshold value (e.g., about 15% or any other value); when a resetting instruction for a currently already-timed-out voice channel is received; when the currently already-timed-out voice channels have a total number greater than a preset third threshold value (e.g., about 20 or any other value); when a preset resetting cycle reaches (e.g., about 1 or 2 minutes or any other value); when the currently already-timed-out voice channels have a total number with a ratio over a total number of the voice channels and the ratio is greater than a preset fourth threshold value (e.g., about 50% or other value); and/or when a ratio of a total number of the currently time-out voice channels over a total number of the currently idle voice channels is greater than a preset fifth threshold value (e.g., about 100% or any other value).

In various embodiments, each threshold value of the first, second, third, fourth, and/or fifth threshold values can be set or determined according to the actual application needs.

When the pre-determined channel re-setting condition is satisfied, the currently already-timed-out portion of the voice channel(s) or all of the voice channel(s) can be re-set as idle voice channel(s). Base on this mechanism, the voice server can obtain a batch of idle voice channels and provide foundation for subsequently increasing the utilizing efficiency of the voice channel(s).

In various embodiments, when the pre-determined channel re-setting condition is satisfied, the re-setting step of the currently already-timed-out portion of the voice channel(s) or all of the voice channel(s) as idle voice channel(s) includes: when the currently idle voice channels have a total number/amount less than the pre-set first threshold value, re-setting the currently already-timed-out portion of the voice channel(s) or all of the voice channel(s) as idle voice channel(s); when the currently idle voice channels have a number with a ratio over a total number of the voice channels and the ratio is less than the preset second threshold value, re-setting the currently already-timed-out portion of the voice channel(s) or all of the voice channel(s) as idle voice channel(s); when a resetting instruction for a currently already-timed-out voice channel is received, re-setting the currently already-timed-out portion of the voice channel(s) or all of the voice channel(s) as idle voice channel(s); when the currently already-timed-out voice channels have a total number greater than the preset third threshold value, re-setting the currently already-timed-out portion of the voice channel(s) or all of the voice channel(s) as idle voice channel(s); when a preset resetting cycle reaches, re-setting the currently already-timed-out portion of the voice channel(s) or all of the voice channel(s) as idle voice channel(s); when the currently already-timed-out voice channels have a total number with a ratio over a total number of the voice channels and the ratio is greater than the preset fourth threshold value, re-setting the currently already-timed-out portion of the voice channel(s) or all of the voice channel(s) as idle voice channel(s); and/or when a ratio of a total number of the currently time-out voice channels over a total number of the currently idle voice channels is greater than the preset fifth threshold value, re-setting the currently already-timed-out portion of the voice channel(s) or all of the voice channel(s) as idle voice channel(s).

As disclosed, after receiving first voice data, the voice server can search for a voice channel corresponding to a first user of the first voice data. When successfully finding the first voice channel corresponding to the first user, the voice server can write the first voice data to the first voice channel. When successfully allocating a second voice channel that is currently already-timed-out to the first user, the voice server can write the first voice data to the second voice channel, and mark the second voice channel as assigned to the first user.

Because a time managing mechanism of the voice channel(s) is introduced in the exemplary methods, the currently already-timed-out voice channel can be re-allocated to other user(s). As such, at different moments or time points, a same voice channel can be repeatedly allocated/assigned to a plurality of different users, which greatly increases utilizing efficiency of the voice channels and thus further reduces deployment of hardware resources. In addition, based on the disclosed mechanism, there is no need to allocate fixed certain voice channel(s) to each user. Existing voice channel allocating mechanism can be abandoned, which can facilitate to greatly improve the number/amount of users allowed to access the voice server.

Figure 2:
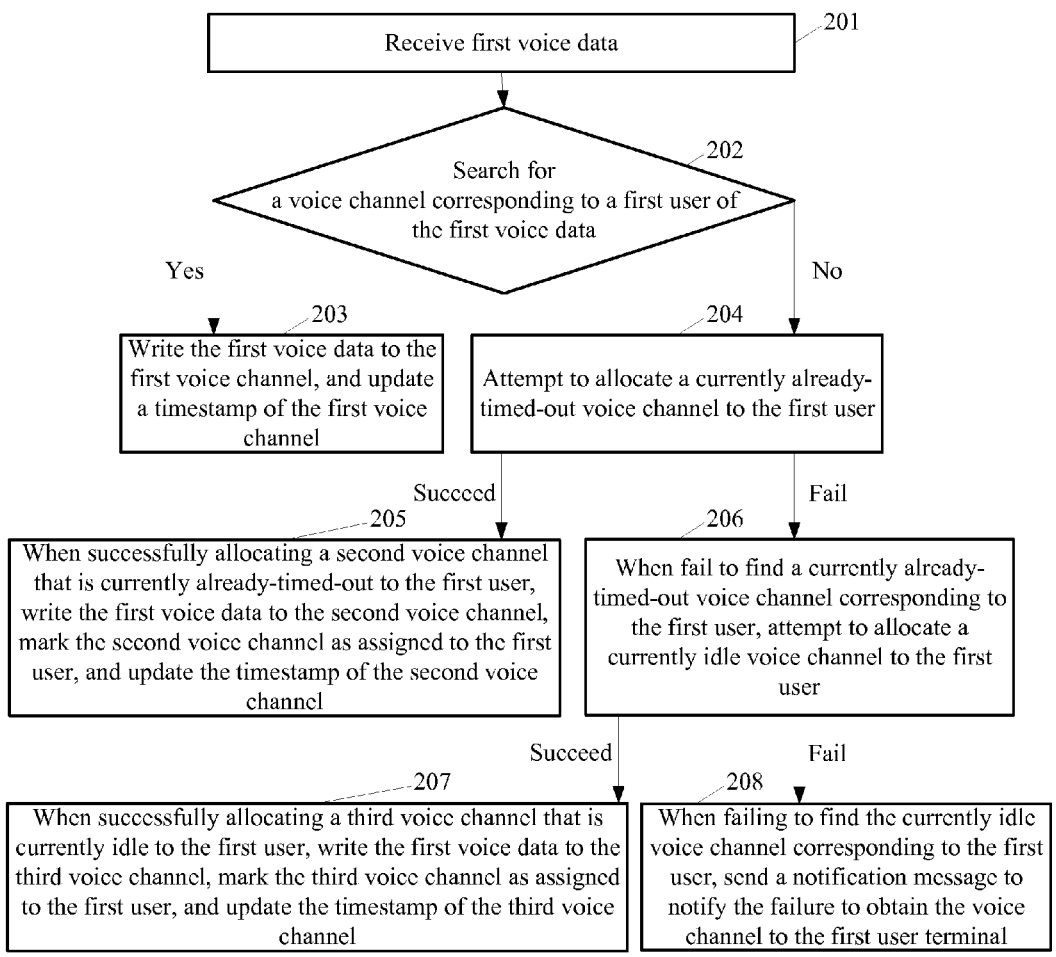
FIG. 2 is a flow chart of another exemplary method for allocating and managing voice channels in accordance with various embodiments.

FIG. 2 is a flow chart of another exemplary method for allocating and managing voice channels in accordance with various embodiments.

In Step 201, a voice server receives first voice data from a first user terminal.

For example, when a user terminal (e.g., a first user terminal) joins to a voice chat room for network chatting, the first user terminal can send some voice data (e.g., first voice data) to the voice server. The voice server can receive the first voice data from the first user terminal. The first user terminal that sends the first voice data belongs to a user (e.g., a first user).

In Step 202, the voice server inquires whether there is a first voice channel corresponding to a first user of the first voice data. When there is the first voice channel corresponding to the first user of the first voice data, Step 203 can be performed. When there is not the first voice channel corresponding to the first user of the first voice data, Step 204 can be performed.

In various embodiments, the first voice data may contain user identification of the first user, and may further contain room identification of a voice chat room (e.g., a first voice chat room) of the first user. Of course, the voice server may store a correspondence relationship between the user identification of the first user and the room identification of the first voice chat room of the first user. Thus, the voice server can search the room identification of the voice chat room of the first user according to the user identification of the first user.

In Step 203, when successfully finding the first voice channel corresponding to the first user, the voice server can write the first voice data to the first voice channel, and update a timestamp of the first voice channel. The updated first voice channel can have the timestamp indicating a time as an updated current time.

In Step 204, when failing to find the voice channel corresponding to the first user, the voice server can attempt to allocate a currently already-timed-out voice channel to the first user.

When successfully allocating a currently already-timed-out voice channel to the first user (e.g., when there is a currently already-timed-out voice channel, the voice server can successfully attempt to allocate the currently already-timed-out voice channel to the first user), Step 205 can be performed.

When failing to allocate a currently already-timed-out voice channel to the first user (e.g., when there are not currently already-timed-out voice channels, the voice server may fail to allocate the currently already-timed-out voice channel(s) to the first user), Step 206 can be performed.

In various embodiments, the attempting step to allocate the currently already-timed-out voice channel for the first user can include: attempting to allocate a currently already-timed-out voice channel that is assigned to a first voice chat room or any other voice chat room, or that is never assigned to any voice chat room, to the first user. For example, the first user is assigned to the first voice chat room (which may currently have multiple users, e.g., about 20 to about 100 users, joined in for a network chatting). Each voice chat room (e.g., the first voice chat room) can contain voice channels in an amount (or a number) that is fixed or dynamic alterable.

In Step 205, when successfully allocating a second voice channel that is currently already-timed-out to the first user, the voice server writes the first voice data to the second voice channel, marks the second voice channel as assigned to the first user, and updates a timestamp of the second voice channel.

In Step 206, when failing to find a currently already-timed-out voice channel to the first user, the voice server attempts to allocate a currently idle voice channel to the first user.

In one embodiment, when successfully allocating the current idle voice channel to the first user (e.g., when an idle voice channel exists currently, it may be successful to attempt to allocate the currently idle voice channel to the first user), Step 207 can be performed. When failing to allocate the currently idle voice channel to the first user (e.g., when an idle voice channel doesn't exist currently, it may fail to attempt to allocate any currently idle voice channel to the first user), Step 208 can be performed.

In various embodiments, the attempting step to allocate the currently idle voice channel for the first user can include: attempting to allocate a currently idle voice channel that is assigned to a first voice chat room or any other voice chat room, or that is never assigned to any voice chat room, to the first user. For example, the first user is assigned to the first voice chat room (which may currently have multiple users, e.g., about 20 to about 100 users, joined in for a network chatting). Each voice chat room (e.g., the first voice chat room) can contain voice channels in an amount (or a number) that is fixed or dynamic alterable.

In Step 207, when successfully allocating a third voice channel that is currently idle to the first user, the voice server writes the first voice data to the third voice channel, marks the third voice channel as assigned to the first user, and updates a timestamp of the third voice channel.

In Step 208, when failing to find the currently idle voice channel to the first user, the voice server sends a notification message to notify the failure to obtain the voice channel to the first user terminal.

As disclosed, after receiving first voice data, the voice server can search for a voice channel corresponding to a first user of the first voice data. When successfully finding the first voice channel to the first user, the voice server can write the first voice data to the first voice channel. When failing to find the voice channel corresponding to the first user, the voice server can attempt to allocate a currently already-timed-out voice channel to the first user. When successfully allocating a second voice channel that is currently already-timed-out to the first user, the voice server can write the first voice data to the second voice channel, and mark the second voice channel as assigned to the first user. When failing to find a currently already-timed-out voice channel to the first user, the voice server can attempt to allocate a currently idle voice channel to the first user.

Because a time managing mechanism of the voice channel(s) is introduced in the exemplary methods, the currently already-timed-out voice channel can be re-allocated to other user(s). As such, at different moments or time points, a same voice channel can be repeatedly allocated/assigned to a plurality of different users, which greatly increases utilizing efficiency of the voice channels and thus further reduces deployment of hardware resources. In addition, based on the disclosed mechanism, there is no need to allocate fixed certain voice channel(s) to each user. Existing voice channel allocating mechanism can be abandoned, which can facilitate to greatly improve the number/amount of users allowed to access the voice server.

Figure 3:
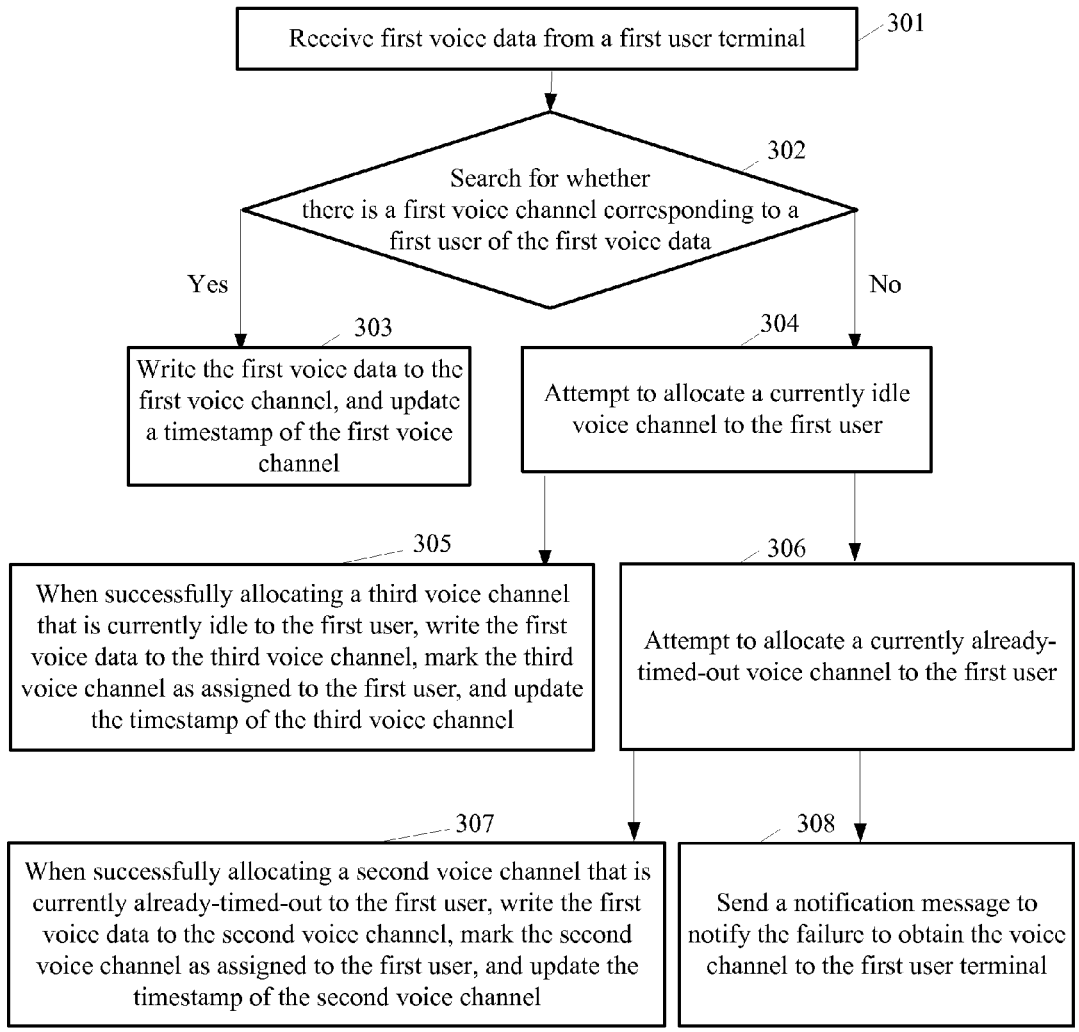
FIG. 3 is a flow chart of another exemplary method for allocating and managing voice channels in accordance with various embodiments.

FIG. 3 is a flow chart of another exemplary method for allocating and managing voice channels in accordance with various embodiments.

In Step 301, a voice server receives first voice data from a first user terminal.

In Step 302, the voice server inquires whether there is a first voice channel corresponding to a first user of the first voice data. When there is the first voice channel corresponding to the first user of the first voice data, Step 303 can be performed. When there is not the first voice channel corresponding to the first user of the first voice data, Step 304 can be performed.

In Step 303, when successfully finding the first voice channel corresponding to the first user, the voice server can write the first voice data to the first voice channel, and update a timestamp of the first voice channel.

In Step 304, when failing to find the voice channel corresponding to the first user, the voice server can attempt to allocate a currently idle voice channel to the first user. When successfully attempting to allocate the currently idle voice channel to the first user, Step 305 can be performed. When failing to attempt to allocate a currently idle voice channel to the first user, Step 306 can be performed.

In Step 305, when successfully allocating a third voice channel that is currently idle to the first user, the voice server writes the first voice data to the third voice channel, marks the third voice channel as assigned to the first user, and updates a timestamp of the third voice channel.

In Step 306, when failing to find the currently idle voice channel to the first user, the voice server attempts to allocate a currently already-timed-out voice channel to the first user. When successfully attempting to allocate a currently already-timed-out voice channel to the first user, Step 307 can be performed. When failing to attempt to allocate a currently already-timed-out voice channel to the first user, Step 308 can be performed.

In Step 307, when successfully allocating a second voice channel that is currently already-timed-out to the first user, the voice server writes the first voice data to the second voice channel, marks the second voice channel as assigned to the first user, and updates a timestamp of the second voice channel.

In Step 308, when failing to find a currently already-timed-out voice channel to the first user, the voice server sends a notification message to notify the failure to obtain the voice channel to the first user terminal.

As disclosed, after receiving the first voice data, the voice server can search for a voice channel corresponding to the first user of the first voice data. When successfully finding the first voice channel corresponding to the first user, the voice server can write the first voice data to the first voice channel. When failing to find the voice channel corresponding to the first user, the voice server can attempt to allocate a currently idle voice channel to the first user. When failing to find the currently idle voice channel to the first user, the voice server can attempt to allocate a currently already-timed-out voice channel to the first user. When successfully allocating a second voice channel that is currently already-timed-out to the first user, the voice server can write the first voice data to the second voice channel and mark the second voice channel as assigned to the first user.

Because a time managing mechanism of the voice channel(s) is introduced in the exemplary methods, the currently already-timed-out voice channel can be re-allocated to other user(s). As such, at different moments or time points, a same voice channel can be repeatedly allocated/assigned to a plurality of different users, which greatly increases utilizing efficiency of the voice channels and thus further reduces deployment of hardware resources. In addition, based on the disclosed mechanism, there is no need to allocate fixed certain voice channel(s) to each user. Existing voice channel allocating mechanism can be abandoned, which can facilitate to greatly improve the number/amount of users allowed to access the voice server.

In an exemplary application scenario, a voice server can be a Qtalk voice server. The Qtalk voice server can provide, e.g., about 1000 voice chat room. Each room can include fixed number of voice channels, e.g., about 50 voice channels. In contrast, a conventional voice chat room can include a maximum of 50 users because each user requires a fixed voice channel. In an example, a user A can use a user terminal a to be added into a voice chat room k, while the voice chat room k may already have about 100 users.

In one example, the voice server can receive voice data S1 sent from the user terminal a. The voice data S1 can contain a user identification of the user A. Based on the user identification of the user A, the voice server can search whether there is a voice channel corresponding to the user A of the voice data S1. When successfully finding a first voice channel corresponding to the user A, the voice server can write the voice data S1 to the first voice channel, and update a timestamp of the first voice channel. When failing to find the voice channel corresponding to the user A, the voice server can attempt to allocate a currently already-timed-out voice channel to the user A. When successfully allocating a second voice channel that is currently already-timed-out to the user A, the voice server can write the voice data S1 to the second voice channel, and mark the second voice channel as assigned to the user A, and update a timestamp of the second voice channel. When failing to find a currently already-timed-out voice channel corresponding to the user A, the voice server can attempt to allocate a currently idle voice channel to the first user. When successfully allocating a third voice channel that is currently idle to the first user, the voice server can write the voice data S1 to the third voice channel, mark the third voice channel as assigned to the user A, and update a timestamp of the third voice channel. When failing to find a currently idle voice channel corresponding to the user A, the voice server can send a notification message to notify the failure to obtain the voice channel to the user terminal a.

In another example, a voice server can receive voice data S1 from a user terminal a. The voice data S1 can contain a user identification of the user A. Base on the user identification of the user A, the voice server can search whether there is a voice channel corresponding to the user A of the voice data S1. When successfully finding a first voice channel corresponding to the user A, the voice server can write the voice data S1 to the first voice channel and update a timestamp of the first voice channel. When failing to find the voice channel corresponding to the user A, the voice server can attempt to allocate a currently idle voice channel to the user A. When successfully allocating a third voice channel that is currently idle to the user A, the voice server can write the voice data S1 to the third voice channel, mark the third voice channel as assigned to the user A, and update a timestamp of the third voice channel. When failing to find a currently idle voice channel corresponding to the user A, the voice server can attempt to allocate a currently already-timed-out voice channel to the first user. When successfully allocating a third voice channel that is currently already-timed-out to the first user, the voice server can write the voice data S1 to the second voice channel, mark the second voice channel as assigned to the user A, and update a timestamp of the second voice channel. When failing to find a currently already-timed-out voice channel corresponding to the user A, the voice server can send a notification message to notify the failure to obtain the voice channel to the user terminal a.

As such, in a voice chat room, it is possible to add any desired number (e.g., hundreds of thousands) of users or, in theory, an unlimited number of users. For example, the disclosed methods, apparatus, systems can provide a voice chat room for a large-scale conference with, e.g., hundreds and/or thousands of users. Of course, a small number of users can be controlled to be able to speak at the same time such that the voice chat room would not be too noisy.

Figure 4A:
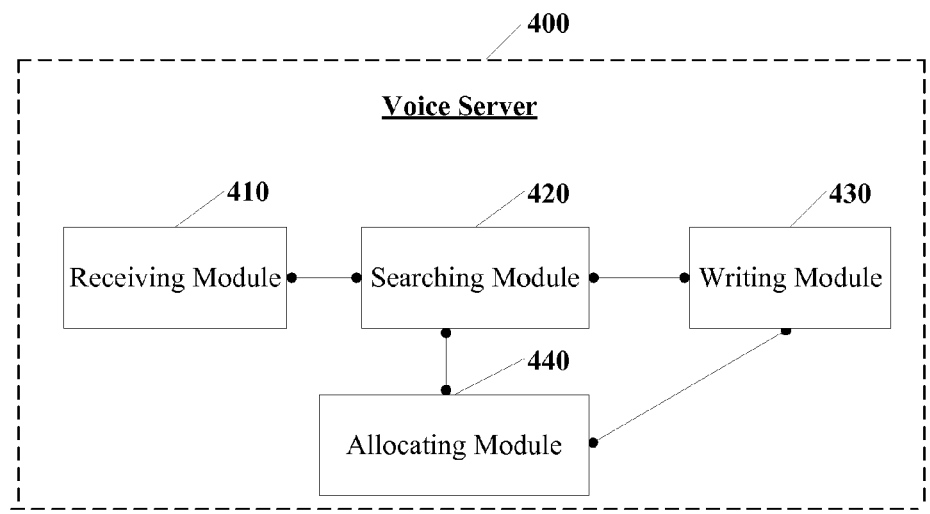
FIG. 4A is a schematic of an exemplary voice server in accordance with various embodiments.

FIG. 4A provides an exemplary voice server 400 that can include a receiving module 410, a searching module 420, a writing module 430, and/or an allocating module 440.

The receiving module 410 is configured to receive first voice data. In various embodiments, the first voice data may contain user identification of the first user, and may further contain room identification of a voice chat room (e.g., a first voice chat room) of the first user. Of course, the voice server 400 may store a correspondence relationship between the user identification of the first user and the room identification of the first voice chat room of the first user. Thus, the voice server 400 can search the room identification of the voice chat room of the first user according to the user identification of the first user.

The searching module 420 is configured to search for a voice channel corresponding to a first user of the first voice data. In various embodiments, before the receiving module 410 receives the first voice data, the allocating module 440 may have allocated a voice channel to the first user, or may not have allocated the voice channel to the first user. For example, the allocating module 440 may not have allocated any voice channel to the first user all the time, or may have re-allocated the voice channel that is previously allocated to the first user to other users, or may re-set the voice channel that is previously allocated to the first user as an idle voice channel and the idle voice channel isn't assigned to any user.

The allocating module 440 is configured to attempt to allocate a currently already-timed-out voice channel to the first user, when the searching module 420 fails to find a voice channel corresponding to the first user.

The writing module 430 is configured, when the allocating module 440 successfully allocates a second voice channel that is currently already-timed-out to the first user, to write the first voice data to the second voice channel and mark the second voice channel assigned to the first user.

In various embodiments, the writing module 430 can further be configured to write the first voice data to the first voice channel, when the searching module 420 successfully finds a first voice channel corresponding to the first user.

In various embodiments, an already-timed-out voice channel may refer to a voice channel having a time expressed by a timestamp after a current time by a time length that is greater than a first time length threshold. The first time length threshold can be one second, two seconds, three seconds, or any time length set according to actual needs. The already-timed-out voice channel is often assigned to a user.

In various embodiments, the allocating module 440 can further be configured to attempt to allocate a currently idle voice channel to the first user, when failing to allocate a currently already-timed-out voice channel to the first user.

The writing module 430 can further be configured, when successfully allocating a third voice channel that is currently idle to the first user, to write the first voice data to the third voice channel, and mark the third voice channel as assigned to the first user.

In other embodiments, the allocating module 440 can be specifically configured to attempt to allocate a currently idle voice channel to the first user when the searching module 420 fails to find the voice channel corresponding to the first user; and to attempt to allocate an already-timed-out voice channel to the first user when failing to allocating a currently idle voice channel to the first user.

The writing module 430 can further be configured, when the allocating module 440 successfully allocates a third voice channel that is currently idle to the first user, to write the first voice data to the third voice channel, and to mark the third voice channel as assigned to the first user.

In various embodiments, the allocating module 440 can be specifically configured to attempt to allocate a currently idle voice channel of the first voice chat room to the first user when the searching module 420 fails to find the voice channel corresponding to the first user; and to attempt to allocate an already-timed-out voice channel of the first voice chat room to the first user when failing to allocating a currently idle voice channel to the first user. The first user can be assigned to the first voice chat room.

Figure 4B:
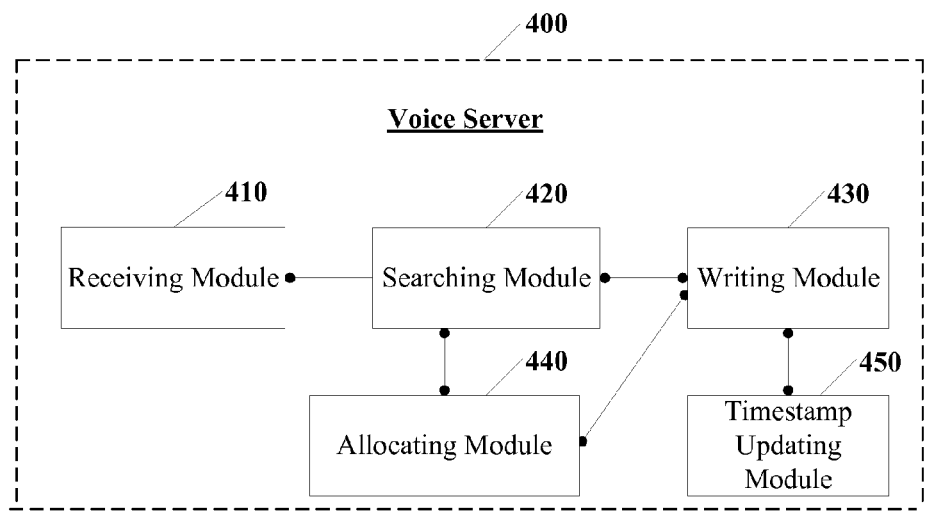
FIG. 4B is a schematic of another exemplary voice server in accordance with various embodiments.

FIG. 4B provides an exemplary voice server 400 further including a timestamp updating module 450 based on the exemplary voice server 400 as depicted in FIG. 4A.

The timestamp updating module 450 is configured to update a first timestamp of the first voice channel when the writing module 430 writes the first voice data to the first voice channel; or to update a second timestamp of the second voice channel when the writing module 430 writes the first voice data to the second voice channel; or to update a third timestamp of the third voice channel when the writing module 430 writes the first voice data to the third voice channel.

Figure 4C:
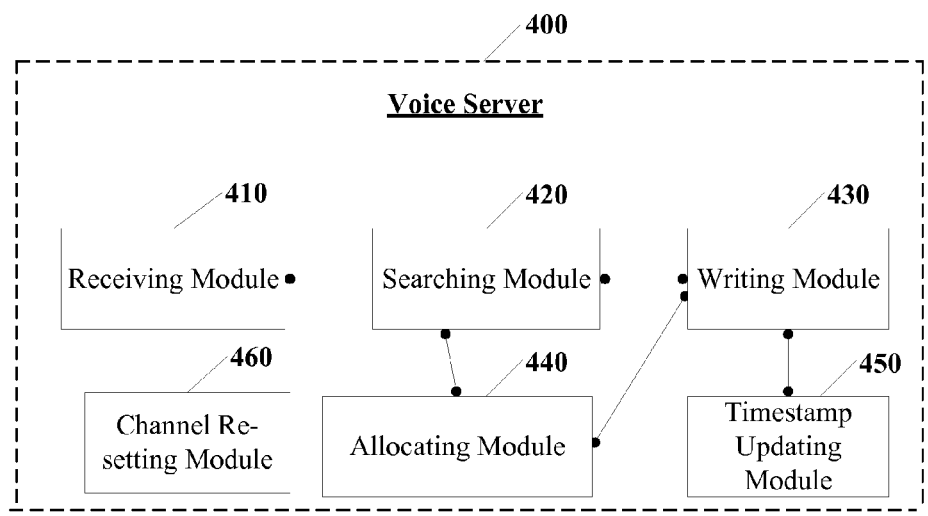
FIG. 4C is a schematic of another exemplary voice server in accordance with various embodiments.

FIG. 4C provides an exemplary voice server 400 further including a channel re-setting module 460 based on the exemplary voice server 400 as depicted in FIG. 4B.

The channel re-setting module 460 is configured to re-set a currently already-timed-out portion of voice channel(s) or all of the voice channel(s) as idle voice channel(s), when a pre-determined channel re-setting condition is satisfied. For example, the channel re-setting module 460 can be specifically configured to re-set a currently timed-out portion of the voice channel(s) or all of the voice channel(s) belonging to the first voice chat room (or other voice chat room) as idle voice channel(s) of the first voice chat room (or any other voice chat room, or never assigned to any voice chat room), when a pre-determined channel re-setting condition is satisfied.

In various embodiments, the pre-determined channel re-setting condition can be the any feasible conditions set according to the actual application needs. For example, the pre-determined channel re-setting condition can contain at least one condition as follows: when the currently idle voice channels have a total number/amount less than a pre-set first threshold value (e.g., about 10 or any other value); when the currently idle voice channels have a number with a ratio over a total number of the voice channels and the ratio is less than a preset second threshold value (e.g., about 15% or any other value); when a resetting instruction for a currently already-timed-out voice channel is received; when the currently already-timed-out voice channels have a total number greater than a preset third threshold value (e.g., about 20 or any other value); when a preset resetting cycle reaches (e.g., about 1 or 2 minutes or any other value); when the currently already-timed-out voice channels have a total number with a ratio over a total number of the voice channels and the ratio is greater than a preset fourth threshold value (e.g., about 50% or other value); and/or when a ratio of a total number of the currently time-out voice channels over a total number of the currently idle voice channels is greater than a preset fifth threshold value (e.g., about 100% or any other value).

In various embodiments, the channel re-setting module 460 can be specifically configured, when the currently idle voice channels have a total number/amount less than the pre-set first threshold value, to re-set the currently already-timed-out portion of the voice channel(s) or all of the voice channel(s) as idle voice channel(s); when the currently idle voice channels have a number with a ratio over a total number of the voice channels and the ratio is less than the preset second threshold value, to re-set the currently already-timed-out portion of the voice channel(s) or all of the voice channel(s) as idle voice channel(s); when a resetting instruction for a currently already-timed-out voice channel is received, to re-set the currently already-timed-out portion of the voice channel(s) or all of the voice channel(s) as idle voice channel(s); when the currently already-timed-out voice channels have a total number greater than the preset third threshold value, to re-set the currently already-timed-out portion of the voice channel(s) or all of the voice channel(s) as idle voice channel(s); when a preset resetting cycle reaches, to re-set the currently already-timed-out portion of the voice channel(s) or all of the voice channel(s) as idle voice channel(s); when the currently already-timed-out voice channels have a total number with a ratio over a total number of the voice channels and the ratio is greater than the preset fourth threshold value, to re-set the currently already-timed-out portion of the voice channel(s) or all of the voice channel(s) as idle voice channel(s); and/or when a ratio of a total number of the currently time-out voice channels over a total number of the currently idle voice channels is greater than the preset fifth threshold value, to re-set the currently already-timed-out portion of the voice channel(s) or all of the voice channel(s) as idle voice channel(s).

It should be noted that each module of the disclosed voice server 400 can function in line with the methods disclosed herein, the repeated, detailed descriptions thereof are therefore omitted.

As disclosed, after receiving first voice data, the voice server 400 can search for a voice channel corresponding to a first user of the first voice data. When successfully finding the first voice channel to the first user, the voice server 400 can write the first voice data to the first voice channel. When failing to find the voice channel corresponding to the first user, the voice server 400 can attempt to allocate a currently already-timed-out voice channel to the first user. When successfully allocating a second voice channel that is currently already-timed-out to the first user, the voice server 400 can write the first voice data to the second voice channel, and mark the second voice channel as assigned to the first user.

Because a time managing mechanism of the voice channel(s) is introduced in the exemplary methods, the currently already-timed-out voice channel can be re-allocated to other user(s). As such, at different moments or time points, a same voice channel can be repeatedly allocated/assigned to a plurality of different users, which greatly increases utilizing efficiency of the voice channels and thus further reduces deployment of hardware resources. In addition, based on the disclosed mechanism, there is no need to allocate fixed certain voice channel(s) to each user. Existing voice channel allocating mechanism can be abandoned, which can facilitate to greatly improve the number/amount of users allowed to access the voice server.

Figure 5:
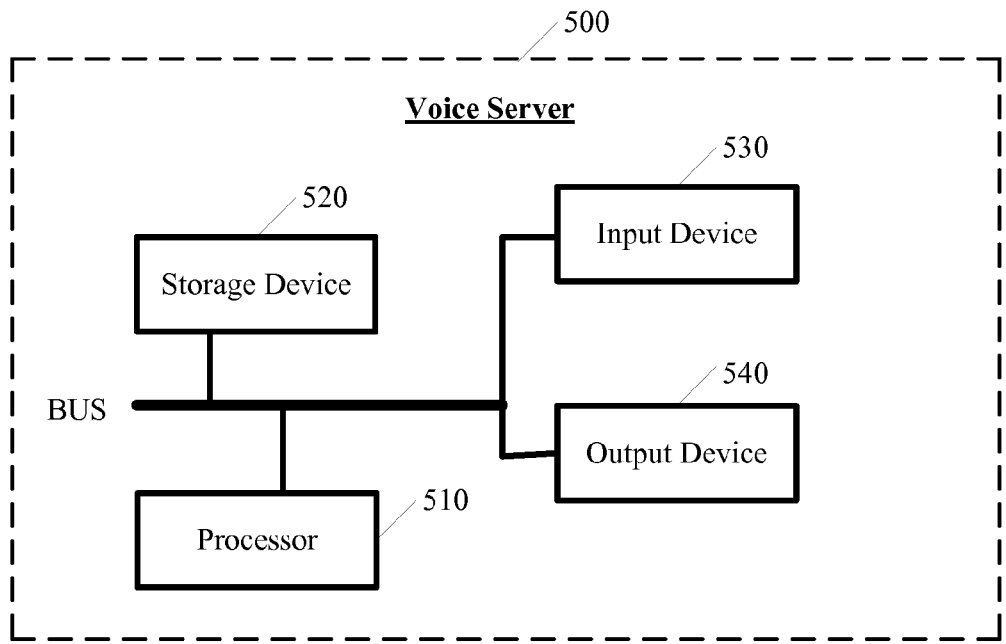
FIG. 5 is a schematic of another exemplary voice server in accordance with various embodiments.

FIG. 5 provides another exemplary voice server 500 including, a processor 510, a storage device 520, an input device 530, and/or an output device 540. One or more processor 510 can be included in the exemplary voice server 500, although FIG. 5 includes one processor for illustration purposes. In various embodiments, the processor 510, the storage device 520, the input device 530, and the output device 540 can be connected via a bus or other connections. For example, FIG. 5 illustrates a bus-connection.

The storage device 520 is configured to store software programs and/or modules (modules). The processor 510 is configured to run software programs and modules stored in the storage device 520 and thus to perform various functional applications and data processing of the voice server 500. The storage device 520 mainly contains a program storage area and a data storage area. The program storage area can include an operation system, and an application program required by at least one function (e.g., an audio playing function, a video playing function). The data storage area can store data (e.g., audio data, phonebook) created according to use of the mobile phone. In addition, the storage device 520 can further contain a high-speed random access memory and nonvolatile storage including e.g., at least one disk memory device, flash memory device, and/or other nonvolatile storage. The input device 530 can be configured to receive inputted digital or character information, and to generate keyboard signals inputted related to the user's settings and function controls of the voice server 500.

For example, the processor 510 can perform the following steps: receiving first voice data; searching for a first voice channel corresponding to a first user of the first voice data; when failing to find the first voice channel corresponding to the first user, attempting to allocate a currently already-timed-out voice channel to the first user; and when successfully allocating a second voice channel that is currently already-timed-out to the first user, writing the first voice data to the second voice channel and marking the second voice channel as assigned to the first user.

In various embodiments, when successfully finding the first voice channel corresponding to the first user, the processor 510 can write the first voice data to the first voice channel.

For example, when a user terminal (e.g., a first user terminal) joins to a voice chat room for network chatting, the first user terminal can send some voice data (e.g., first voice data) to the voice server. The voice server can receive the first voice data from the first user terminal. The first user terminal that sends the first voice data belongs to a user (e.g., a first user).

In various embodiments, the first voice data may contain user identification of the first user, and may further contain room identification of a voice chat room (e.g., a first voice chat room) of the first user. Of course, the voice server may store a correspondence relationship between the user identification of the first user and the room identification of the first voice chat room of the first user. Thus, the voice server can search the room identification of the voice chat room of the first user according to the user identification of the first user.

In various embodiments, before receiving the first voice data, the voice server 500 may have allocated a voice channel to the first user, or may not have allocated the voice channel to the first user. For example, the voice server 500 may not have allocated any voice channel to the first user all the time, or may have re-allocated the voice channel that is previously allocated to the first user to other users, or may re-set the voice channel that is previously allocated to the first user as an idle voice channel and the idle voice channel isn't assigned to any user.

The voice channel can be a storage resource (e.g., RAM) used to store voice data on a voice server. Information including, e.g., timestamp and/or user identification of a current user can be recorded in the voice channel.

In various embodiments, when the first voice data is written into the first voice channel, a timestamp of the first voice channel can be further updated. The updated first voice channel can have a timestamp indicating a time as an updated current time.

In various embodiments, an already-timed-out voice channel may refer to a voice channel having a time expressed by a timestamp after a current time by a time length that is greater than a first time length threshold. The first time length threshold can be one second, two seconds, three seconds, or any time length set according to actual needs. The already-timed-out voice channel is often assigned to a user.

In various embodiments, when the first voice data is written into the second voice channel, a timestamp of the second voice channel can be further updated. The updated second voice channel can have a timestamp indicating a time as an updated current time.

In various embodiments, when failing to find the first voice channel corresponding to the first user, the processor 510 can attempt to allocate a currently idle voice channel to the first user. When successfully allocating to the first user a third voice channel that is currently idle, the processor 510 can write the first voice data to the third voice channel and mark the third voice channel as assigned to the first user (e.g., the processor 510 can write a user identification of the first user into the third voice channel). In addition, when failing to allocate the currently idle voice channel to the first user (e.g., no idle voice channel is currently available), the processor 510 can notify the first user of the failure to obtain the voice channel (e.g., by sending a notification message to notify the failure to obtain the voice channel to the first user terminal).

In various embodiments, prior to attempting to allocate the currently already-timed-out voice channel to the first user, the method further includes: when failing to find the voice channel corresponding to the first user, the processor 510 can attempt to allocate a currently idle voice channel to the first user; when successfully allocating a third voice channel that is currently idle to the first user, the processor 510 can write the first voice data to the third voice channel and mark the third voice channel as assigned to the first user; when failing to allocate a currently idle voice channel to the first user, the processor 510 can attempt to perform the attempting step to allocate the currently already-timed-out voice channel to the first user; when successfully allocating a second voice channel that is currently already-timed-out to the first user, the processor 510 can write the first voice data to the second voice channel and marking the second voice channel as assigned to the first user; and/or when failing to find the currently already-timed-out voice channel corresponding to the first user (e.g., no already-timed-out voice channels are currently available), the processor 510 can notify the first user of the failure to obtain the voice channel (e.g., by sending a notification message to notify the failure to obtain the voice channel to the first user terminal).

In various embodiments, when the first voice data is written to the third voice channel, a timestamp of the third voice channel can be further updated. The updated third voice channel can have a timestamp indicating a time as an updated current time.

In some embodiments, when some voice data (e.g., the first voice data) is written into some voice channels, further, all timestamps of the voice channels can be further updated. The updated voice channel can have a timestamp indicating a time as an updated current time.

In various embodiments, the processor 510 attempting to allocate the currently already-timed-out voice channel for the first user can include: attempting to allocate a currently already-timed-out voice channel that is assigned to a first voice chat room or any other voice chat room, or that is never assigned to any voice chat room, to the first user. For example, the first user is assigned to the first voice chat room (which may currently have multiple users, e.g., about 20 to about 100 users, joined in for a network chatting). Each voice chat room (e.g., the first voice chat room) can contain voice channels in an amount (or a number) that is fixed or dynamic alterable.

In various embodiments, the processor 510 attempting to allocate the currently idle voice channel for the first user can include: attempting to allocate a currently idle voice channel that is assigned to a first voice chat room or any other voice chat room, or that is never assigned to any voice chat room, to the first user. For example, the first user is assigned to the first voice chat room (which may currently have multiple users, e.g., about 20 to about 100 users, joined in for a network chatting). Each voice chat room (e.g., the first voice chat room) can contain voice channels in an amount (or a number) that is fixed or dynamic alterable.

In various embodiments, when a pre-determined channel re-setting condition is satisfied, the processor 510 can re-set a currently already-timed-out portion of the voice channel(s) or all of the voice channel(s) of the voice channel(s) as idle voice channel(s). For example, when a pre-determined channel re-setting condition is satisfied, the currently already-timed-out portion of the voice channel(s) or all of the voice channel(s) belonging to the first voice chat room (or other voice chat rooms) can be re-set as idle voice channel(s) of the first voice chat room (or other voice chat room(s) or none voice chat room).

In various embodiments, the pre-determined channel re-setting condition can be the any feasible conditions set according to actual application needs. For example, the pre-determined channel re-setting condition can contain at least one condition as follows: when the currently idle voice channels have a total number/amount less than a pre-set first threshold value (e.g., about 10 or any other value); when the currently idle voice channels have a number with a ratio over a total number of the voice channels and the ratio is less than a preset second threshold value (e.g., about 15% or any other value); when a resetting instruction for a currently already-timed-out voice channel is received; when the currently already-timed-out voice channels have a total number greater than a preset third threshold value (e.g., about 20 or any other value); when a preset resetting cycle reaches (e.g., about 1 or 2 minutes or any other value); when the currently already-timed-out voice channels have a total number with a ratio over a total number of the voice channels and the ratio is greater than a preset fourth threshold value (e.g., about 50% or other value); and/or when a ratio of a total number of the currently time-out voice channels over a total number of the currently idle voice channels is greater than a preset fifth threshold value (e.g., about 100% or any other value).

When the pre-determined channel re-setting condition is satisfied, the currently already-timed-out portion of the voice channel(s) or all of the voice channel(s) can be re-set as idle voice channel(s). Base on this mechanism, the voice server can obtain a batch of idle voice channels and provide foundation for subsequently increasing the utilizing efficiency of the voice channel(s).

In various embodiments, when a pre-determined channel re-setting condition is satisfied, the processor 510 can re-set a currently already-timed-out portion of the voice channel(s) or all of the voice channel(s) of the voice channel(s) as idle voice channel(s). The processor 510 can be configured, when the currently idle voice channels have a total number/amount less than the pre-set first threshold value, to re-set the currently already-timed-out portion of the voice channel(s) or all of the voice channel(s) as idle voice channel(s); when the currently idle voice channels have a number with a ratio over a total number of the voice channels and the ratio is less than the preset second threshold value, to re-set the currently already-timed-out portion of the voice channel(s) or all of the voice channel(s) as idle voice channel(s); when a resetting instruction for a currently already-timed-out voice channel is received, to re-set the currently already-timed-out portion of the voice channel(s) or all of the voice channel(s) as idle voice channel(s); when the currently already-timed-out voice channels have a total number greater than the preset third threshold value, to re-set the currently already-timed-out portion of the voice channel(s) or all of the voice channel(s) as idle voice channel(s); when a preset resetting cycle reaches, to re-set the currently already-timed-out portion of the voice channel(s) or all of the voice channel(s) as idle voice channel(s); when the currently already-timed-out voice channels have a total number with a ratio over a total number of the voice channels and the ratio is greater than the preset fourth threshold value, to re-set the currently already-timed-out portion of the voice channel(s) or all of the voice channel(s) as idle voice channel(s); and/or when a ratio of a total number of the currently time-out voice channels over a total number of the currently idle voice channels is greater than the preset fifth threshold value, to re-set the currently already-timed-out portion of the voice channel(s) or all of the voice channel(s) as idle voice channel(s).

As disclosed, after receiving first voice data, the voice server 500 can search for a voice channel corresponding to a first user of the first voice data. When successfully finding the first voice channel to the first user, the voice server 500 can write the first voice data to the first voice channel. When failing to find the voice channel corresponding to the first user, the voice server 500 can attempt to allocate a currently already-timed-out voice channel to the first user. When successfully allocating a second voice channel that is currently already-timed-out to the first user, the voice server 500 can write the first voice data to the second voice channel, and mark the second voice channel as assigned to the first user.

Because a time managing mechanism of the voice channel(s) is introduced in the exemplary methods, the currently already-timed-out voice channel can be re-allocated to other user(s). As such, at different moments or time points, a same voice channel can be repeatedly allocated/assigned to a plurality of different users, which greatly increases utilizing efficiency of the voice channels and thus further reduces deployment of hardware resources. In addition, based on the disclosed mechanism, there is no need to allocate fixed certain voice channel(s) to each user. Existing voice channel allocating mechanism can be abandoned, which can facilitate to greatly improve the number/amount of users allowed to access the voice server.

Figure 6:
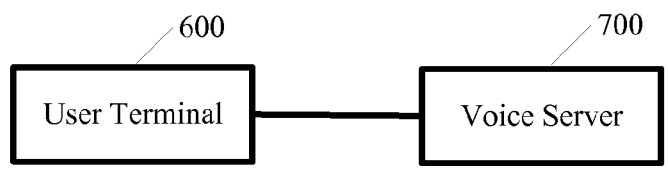
FIG. 6 is a schematic of an exemplary communication system in accordance with various embodiments.

FIG. 6 provides an exemplary communication system including a user terminal 600 and a voice server 700. For example, the user terminal 600 is configured to send first voice data to the voice server 700. The communication system can be configured in an environment as shown in FIG. 8.

The voice server 700 is configured to receive the first voice data from the user terminal 600; search for a voice channel corresponding to a first user of the first voice data; when failing to find the voice channel corresponding to the first user, attempt to allocate a currently already-timed-out voice channel to the first user; and when successfully allocating a second voice channel that is currently already-timed-out to the first user, write the first voice data to the second voice channel, and mark the second voice channel as assigned to the first user.

In various embodiments, the voice server 700 can be further configured to write the first voice data to the first voice channel when successfully finding the voice channel corresponding to the first user.

In various embodiments, the first voice data may contain user identification of the first user, and may further contain room identification of a voice chat room (e.g., a first voice chat room) of the first user. Of course, the voice server 700 may store a correspondence relationship between the user identification of the first user and the room identification of the first voice chat room of the first user. Thus, the voice server 700 can search the room identification of the voice chat room of the first user according to the user identification of the first user.

In various embodiments, before receiving the first voice data, the voice server 700 may have allocated a voice channel to the first user, or may not have allocated the voice channel to the first user. For example, the voice server 700 may not have allocated any voice channel to the first user all the time, or may have re-allocated the voice channel that is previously allocated to the first user to other users, or may re-set the voice channel that is previously allocated to the first user as an idle voice channel and the idle voice channel isn't assigned to any user.

In various embodiments, when the first voice data is written into the first voice channel, the voice server 700 can update a timestamp of the first voice channel. The updated first voice channel can have a timestamp indicating a time as an updated current time.

In various embodiments, an already-timed-out voice channel may refer to a voice channel having a time expressed by a timestamp after a current time by a time length that is greater than a first time length threshold. The first time length threshold can be one second, two seconds, three seconds, or any time length set according to actual needs. The already-timed-out voice channel is often assigned to a user.

In various embodiments, when the first voice data is written into the second voice channel, the voice server 700 can update a timestamp of the second voice channel. The updated second voice channel can have a timestamp indicating a time as an updated current time.

In various embodiments, when failing to find the first voice channel corresponding to the first user, the voice server 700 can attempt to allocate a currently idle voice channel to the first user. When successfully allocating to the first user a third voice channel that is currently idle, the voice server 700 can write the first voice data to the third voice channel and mark the third voice channel as assigned to the first user (e.g., the voice server 700 can write a user identification of the first user into the third voice channel). In addition, when failing to allocate the currently idle voice channel to the first user (e.g., no idle voice channel is currently available), the voice server 700 can notify the first user of the failure to obtain the voice channel (e.g., by sending a notification message to notify the failure to obtain the voice channel to the first user terminal).

In various embodiments, prior to attempting to allocate the currently already-timed-out voice channel to the first user, the method further includes: when failing to find the voice channel corresponding to the first user, the voice server 700 can attempt to allocate a currently idle voice channel to the first user; when successfully allocating a third voice channel that is currently idle to the first user, the voice server 700 can write the first voice data to the third voice channel and mark the third voice channel as assigned to the first user; when failing to allocate a currently idle voice channel to the first user, the voice server 700 can attempt to perform the attempting step to allocate the currently already-timed-out voice channel to the first user; when successfully allocating a second voice channel that is currently already-timed-out to the first user, the voice server 700 can write the first voice data to the second voice channel and marking the second voice channel as assigned to the first user; and/or when failing to find the currently already-timed-out voice channel corresponding to the first user (e.g., no already-timed-out voice channels are currently available), the voice server 700 can notify the first user of the failure to obtain the voice channel (e.g., by sending a notification message to notify the failure to obtain the voice channel to the first user terminal).

In various embodiments, when the first voice data is written to the third voice channel, the voice server 700 can update a timestamp of the third voice channel. The updated third voice channel can have a timestamp indicating a time as an updated current time.

In various embodiments, the voice server 700 attempting to allocate the currently already-timed-out voice channel for the first user can include: attempting to allocate a currently already-timed-out voice channel that is assigned to a first voice chat room or any other voice chat room, or that is never assigned to any voice chat room, to the first user. For example, the first user is assigned to the first voice chat room (which may currently have multiple users, e.g., about 20 to about 100 users, joined in for a network chatting). Each voice chat room (e.g., the first voice chat room) can contain voice channels in an amount (or a number) that is fixed or dynamic alterable.

In various embodiments, the voice server 700 attempting to allocate the currently idle voice channel for the first user can include: attempting to allocate a currently idle voice channel that is assigned to a first voice chat room or any other voice chat room, or that is never assigned to any voice chat room, to the first user. For example, the first user is assigned to the first voice chat room (which may currently have multiple users, e.g., about 20 to about 100 users, joined in for a network chatting). Each voice chat room (e.g., the first voice chat room) can contain voice channels in an amount (or a number) that is fixed or dynamic alterable.

In various embodiments, when a pre-determined channel re-setting condition is satisfied, the voice server 700 can re-set a currently already-timed-out portion of the voice channel(s) or all of the voice channel(s) of the voice channel(s) as idle voice channel(s). For example, when a pre-determined channel re-setting condition is satisfied, the currently already-timed-out portion of the voice channel(s) or all of the voice channel(s) belonging to the first voice chat room (or other voice chat rooms) can be re-set as idle voice channel(s) of the first voice chat room (or other voice chat room(s) or none voice chat room).

In various embodiments, the pre-determined channel re-setting condition can be the any feasible conditions set according to actual application needs. For example, the pre-determined channel re-setting condition can contain at least one condition as follows: when the currently idle voice channels have a total number/amount less than a pre-set first threshold value (e.g., about 10 or any other value); when the currently idle voice channels have a number with a ratio over a total number of the voice channels and the ratio is less than a preset second threshold value (e.g., about 15% or any other value); when a resetting instruction for a currently already-timed-out voice channel is received; when the currently already-timed-out voice channels have a total number greater than a preset third threshold value (e.g., about 20 or any other value); when a preset resetting cycle reaches (e.g., about 1 or 2 minutes or any other value); when the currently already-timed-out voice channels have a total number with a ratio over a total number of the voice channels and the ratio is greater than a preset fourth threshold value (e.g., about 50% or other value); and/or when a ratio of a total number of the currently time-out voice channels over a total number of the currently idle voice channels is greater than a preset fifth threshold value (e.g., about 100% or any other value).

In various embodiments, when a pre-determined channel re-setting condition is satisfied, the voice server 700 can re-set a currently already-timed-out portion of the voice channel(s) or all of the voice channel(s) of the voice channel(s) as idle voice channel(s). The voice server 700 can be configured, when the currently idle voice channels have a total number/amount less than the pre-set first threshold value, to re-set the currently already-timed-out portion of the voice channel(s) or all of the voice channel(s) as idle voice channel(s); when the currently idle voice channels have a number with a ratio over a total number of the voice channels and the ratio is less than the preset second threshold value, to re-set the currently already-timed-out portion of the voice channel(s) or all of the voice channel(s) as idle voice channel(s); when a resetting instruction for a currently already-timed-out voice channel is received, to re-set the currently already-timed-out portion of the voice channel(s) or all of the voice channel(s) as idle voice channel(s); when the currently already-timed-out voice channels have a total number greater than the preset third threshold value, to re-set the currently already-timed-out portion of the voice channel(s) or all of the voice channel(s) as idle voice channel(s); when a preset resetting cycle reaches, to re-set the currently already-timed-out portion of the voice channel(s) or all of the voice channel(s) as idle voice channel(s); when the currently already-timed-out voice channels have a total number with a ratio over a total number of the voice channels and the ratio is greater than the preset fourth threshold value, to re-set the currently already-timed-out portion of the voice channel(s) or all of the voice channel(s) as idle voice channel(s); and/or when a ratio of a total number of the currently time-out voice channels over a total number of the currently idle voice channels is greater than the preset fifth threshold value, to re-set the currently already-timed-out portion of the voice channel(s) or all of the voice channel(s) as idle voice channel(s).

Figure 7:
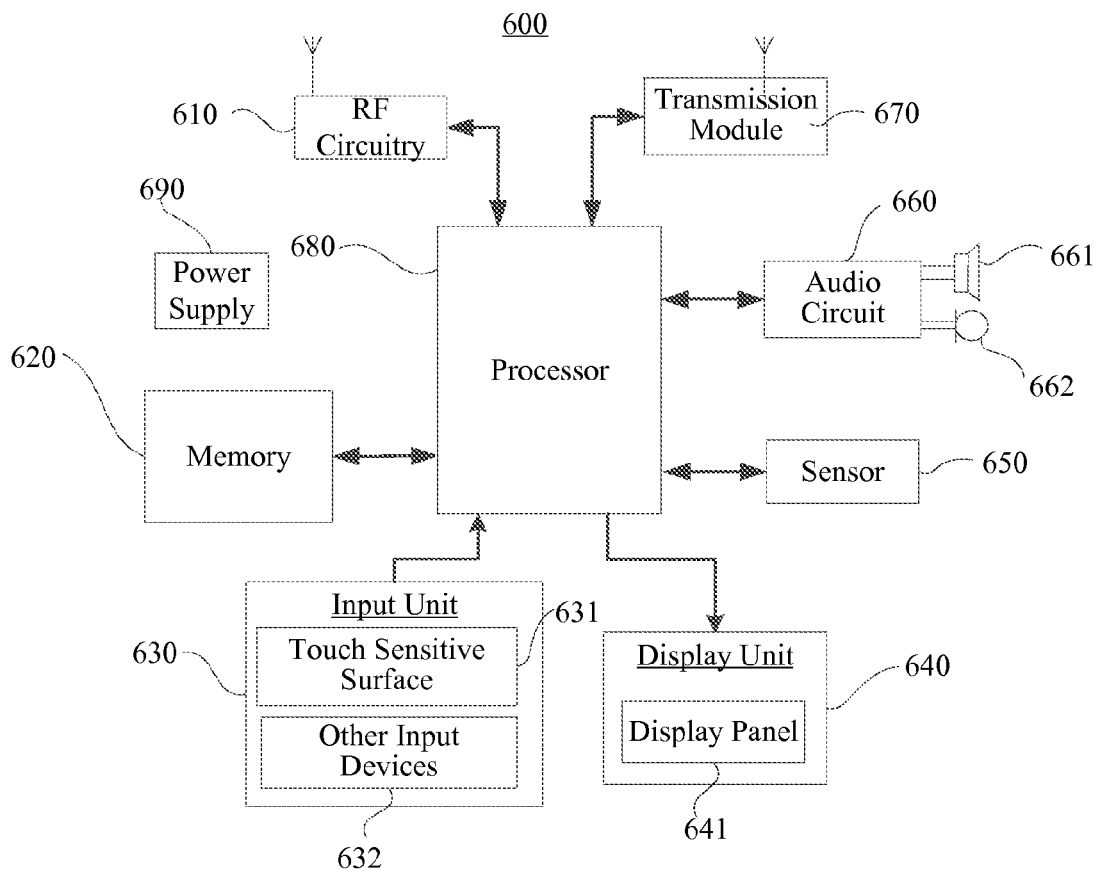
FIG. 7 is a schematic of an exemplary user terminal in accordance with various embodiments.

The exemplary user terminal 600 can include a mobile phone, a tablet computer, a PDA (personal digital assistant), a POS (point of sales), a car-carrying-computer, or any desired terminal devices. In one example, the exemplary user terminal 600 is a mobile phone. FIG. 7 depicts at least a portion of an exemplary user terminal 600.

As shown in FIG. 7, the exemplary terminal 600 can include an RF (Radio Frequency) circuitry 610, a memory 620 including one or more computer-readable storage media, an input unit 630, a display unit 640, a sensor 650, an audio circuit 660, a transmission module 670, a processor 680 including one or more processing cores, a power supply 690, and/or other components. In various embodiments, the terminal(s) described herein can include more or less components as depicted in FIG. 7. Certain parts can be omitted, combined, re-placed, and added.

The RF circuitry 610 may be used to send and receive information or send and receive signal during communication. In particular, after receiving downlink information from a base station, such information can be processed by the one or more processors 680. Further, the data related to the uplink can be sent to the base station. Generally, the RF circuitry 610 can include, but be not limited to, an antenna, at least one amplifier, a tuner, one or more oscillators, user identity module (SIM) card, a transceiver, a coupler, LNA (i.e., Low Noise Amplifier), duplexer, etc. In addition, the RF circuitry 610 may communicate with other devices via a wireless communication network. The wireless communication may use any communication standards or protocols, including but not limited to, GSM (Global System for Mobile Communications), GPRS (General Packet Radio Service), CDMA (Code Division Multiple Access), WCDMA (Wideband Code Division Multiple Access), LTE (Long Term Evolution), e-mail, SMS (Short Messaging Service), etc.

The memory 620 can be used for storing software programs and modules, such as those software programs and modules corresponding to the terminal and the third party service provider as described in FIGS. 3-5 for business processing. By running software programs and modules stored in the memory 620, the processor 680 can perform various functional applications and data processing to achieve business processing. The memory 620 can include a program storage area and a data storage area. The program storage area can store the operating system, applications (such as sound playback, image playback, etc.) required by at least one function. The data storage area can store data (such as audio data, phone book, etc.) created when using the terminal 600. In addition, the memory 620 may include a high-speed random access memory, a non-volatile memory, such as at least one disk memory, flash memory, and/or other volatile solid-state memory elements. Accordingly, the memory 620 may further include a memory controller to provide the processor 680 and the input unit 630 with access to the memory 620.

The input unit 630 can be used to receive inputted numeric or character information, and to generate signal input of keyboard, mouse, joystick, and trackball or optical signal input related to the user settings and function controls. Specifically, the input unit 630 may include a touch sensitive surface 631 and other input device(s) 632. The touch-sensitive surface 631, also known as a touch screen or touch panel, may collect touch operations that a user conducts on or near the touch-sensitive surface 631. For example, a user may use a finger, a stylus, and any other suitable object or attachment on the touch-sensitive surface 631 or on an area near the touch-sensitive surface 631. The touch-sensitive surface 631 may drive a connecting device based on a preset program. Optionally, the touch sensitive surface 631 may include a touch detection device and a touch controller. The touch detection device can detect user's touch position and detect a signal due to a touch operation and send the signal to the touch controller. The touch controller can receive touch information from the touch detection device, convert the touch information into contact coordinates to send to the processor 680, and receive commands sent from the processor 680 to execute. Furthermore, the touch sensitive surface 631 can be realized by resistive, capacitive, infrared surface acoustic wave, and/or other types of surface touch. In addition to the touch sensitive surface 631, the input unit 630 may also include other input device(s) 632. Specifically, the other input device(s) 632 may include, but be not limited to, a physical keyboard, function keys (such as volume control buttons, switch buttons, etc.), a trackball, a mouse, an operating lever, or combinations thereof.

The display unit 640 can be used to display information inputted by the user, information provided to the user, and a variety of graphical user interfaces of the terminal 600. These graphical user interfaces can be formed by images, text, icons, videos, and/or any combinations thereof. The display unit 640 may include a display panel 641 configured by, e.g., LCD (Liquid Crystal Display), OLED (Organic Light-Emitting Diode), etc. Further, the touch sensitive surface 631 may cover the display panel 641. When the touch sensitive surface 631 detects a touch operation on or near the touch sensitive surface, the touch operation can be sent to the processor 680 to determine a type of the touch operation. Accordingly, the processor 680 can provide visual output on the display panel 641. Although in FIG. 7 the touch-sensitive surface 631 and the display panel 641 are shown as two separate components to achieve input and output functions, in some embodiments, the touch sensitive surface 631 and the display panel 641 can be integrated to perform input and output functions.

The terminal 600 may further include at least one sensor 650, such as optical sensors, motion sensors, and other suitable sensors. Specifically, the optical sensors may include an ambient optical sensor and a proximity sensor. The ambient optical sensor may adjust brightness of the display panel 641 according to the brightness of ambient light. The proximity sensor can turn off the display panel 641 and/or turn backlighting, when the terminal 600 moves to an ear. As a type of motion sensor, a gravity sensor may detect amount of an acceleration in each direction (e.g., including three axis) and detect magnitude and direction of gravity when in stationary. The gravity sensor can be used to identify phone posture (for example, switching between horizontal and vertical screens, related games, magnetometer calibration posture, etc.), vibration recognition related functions (e.g., pedometer, percussion, etc.), etc. The terminal 600 can also be configured with, e.g., a gyroscope, a barometer, a hygrometer, a thermometer, an infrared sensor, and/or other sensors.

The audio circuit 660, the speaker 661, and the microphone 662 may provide an audio interface between the user and terminal 600. The audio circuit 660 may transmit an electrical signal converted from the received audio data to the speaker 661 to convert into audio signal output. On the other hand, the microphone 662 can convert the collected sound signal to an electrical signal, which can be received by the audio circuit 660 to convert into audio data. The audio data can be output to the processor 680 for processing and then use the RF circuitry 610 to transmit to, e.g., another terminal. Alternatively, the audio data can be output to the memory 620 for further processing. The audio circuitry 660 may also include an earplug jack to provide communications between the peripheral headset and the terminal 600.

The terminal 600 may use the transmission module 670 to help users send and receive emails, browse websites, access streaming media, etc. The transmission module 670 can provide users with a wireless or wired broadband Internet access. In various embodiments, the transport module 670 can be configured within or outside of the terminal 600 as depicted in FIG. 7.

The processor 680 can be a control center of the terminal 600: using a variety of interfaces and circuits to connect various parts, e.g., throughout a mobile phone; running or executing software programs and/or modules stored in the memory 620; calling the stored data in the memory 620; and/or performing various functions and data processing of the terminal 600 to monitor the overall mobile phone. Optionally, the processor 680 may include one or more processing cores. In an exemplary embodiment, the processor 680 may integrate application processor with modulation and demodulation processor. The application processor is mainly used to process operating system, user interface, and applications. The modulation and demodulation processor is mainly used to deal with wireless communications. In various embodiments, the modulation and demodulation processor may or may not be integrated into the processor 680.

The terminal 600 may further include a power supply 690 (such as a battery) to power various components of the terminal. In an exemplary embodiment, the power supply can be connected to the processor 680 via the power management system, and thus use the power management system to manage charging, discharging, and/or power management functions. The power supply 690 may also include one or more DC or AC power supplies, a recharging system, a power failure detection circuit, a power converter or inverter, a power status indicator and/or any other suitable components.

Although not shown in FIG. 7, the terminal 600 can further include a camera, a Bluetooth module, etc. without limitation. Specifically, the terminal can have a display unit of a touch screen display, a memory, and one or more programs stored in the memory. The terminal can be configured to use one or more processor to execute the one or more programs stored in the memory. For example, the processor 680 can at least send first voice data to a voice server.

Various embodiments also provide a computer storage medium. The computer storage medium may store a program. Execution of the program includes some or all of the steps of the exemplary methods for testing game data as disclosed herein.

The modules and/or units included herein are described according to their functional logic, but are not limited to the above descriptions as long as the modules/units can implement corresponding functions. Further, the specific name of each functional unit is used for distinguishing from on another without limiting the protection scope of the present disclosure. In various embodiments, the disclosed modules/units can be configured in one apparatus or configured in multiple apparatus as desired. The modules/units disclosed herein can be integrated in one module/unit/apparatus or in multiple modules/units/apparatus. Each of the modules/units disclosed herein can be divided into one or more sub-modules/units, which can be recombined in any manner.

Note that suitable software and/or hardware (e.g., a universal hardware platform) may be included and used in the disclosed methods and apparatus. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

The term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The embodiments disclosed herein are exemplary only. The order by which the foregoing examples of the present disclosure are presented merely reflects the convenience of description. It does not imply the preference among the examples. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods, apparatus and communication systems for allocating and managing voice channels are provided. Utilizing efficiency of the voice channels is therefore improved and deploying of hardware resources can be reduced. The voice server can include a receiving module, a searching module, an allocating module, and a writing module. The communication system can include a voice server interacting with a user terminal.

As disclosed, after receiving first voice data, the voice server can search for a voice channel corresponding to a first user of the first voice data. When successfully finding the first voice channel corresponding to the first user, the voice server can write the first voice data to the first voice channel. When successfully allocating a second voice channel that is currently already-timed-out to the first user, the voice server can write the first voice data to the second voice channel, and mark the second voice channel as assigned to the first user.

Because a time managing mechanism of the voice channel(s) is introduced in the exemplary methods, the currently already-timed-out voice channel can be re-allocated to other user(s). As such, at different moments or time points, a same voice channel can be repeatedly allocated/assigned to a plurality of different users, which greatly increases utilizing efficiency of the voice channels and thus further reduces deployment of hardware resources. In addition, based on the disclosed mechanism, there is no need to allocate fixed certain voice channel(s) to each user. Existing voice channel allocating mechanism can be abandoned, which can facilitate to greatly improve the number/amount of users allowed to access the voice server.

What is claimed is:
1. A method for managing voice channels comprising:
receiving, by a voice server, first voice data;
searching, by the voice server, for a first voice channel corresponding to a first user of the first voice data;
when failing to find the first voice channel corresponding to the first user, attempting, by the voice server, to allocate a currently already-timed-out voice channel to the first user;
when successfully allocating a second voice channel that is currently already-timed-out to the first user, writing, by the voice server, the first voice data to the second voice channel and marking the second voice channel as assigned to the first user;
writing the first voice data to the first voice channel when successfully finding the first voice channel corresponding to the first user; and when a pre-determined channel re-setting condition is satisfied, re-setting a currently already-timed-out portion of voice channels or all of voice channels as idle voice channels;

wherein when the pre-determined channel re-setting condition is satisfied for the re-setting includes:
when a number of the currently idle voice channel is less than a preset first threshold value,
when the number of the currently idle voice channel has a ratio over a total number of the voice channel and the ratio is less than a preset second threshold value,
when a re-setting instruction for the currently already-timed-out voice channel is received,
when a preset re-setting cycle reaches,
when a number of the currently already-timed-out voice channel is greater than a preset third threshold value,
when the number of the currently already-timed-out voice channel has a ratio over a total number of the voice channel and the ratio is greater than a preset fourth threshold value, or
when a ratio of the number of the currently already-timed-out voice channel over the number of the currently idle voice channel is greater than a preset fifth threshold value.

2. The method according to claim 1, further including:
when failing to find the first voice channel corresponding to the first user, attempting, by the voice server, to allocate a currently idle voice channel to the first user; and
when successfully allocating to the first user a third voice channel that is currently idle, writing, by the voice server, the first voice data to the third voice channel and marking the third voice channel as assigned to the first user.

3. The method according to claim 1, wherein, before attempting to allocate the currently already-timed-out voice channel to the first user, the method further includes:
when failing to find the first voice channel corresponding to the first user, attempting to allocate a currently idle voice channel to the first user;
when successfully allocating to the first user a third voice channel that is currently idle, writing, by the voice server, the first voice data to the third voice channel and marking the third voice channel as assigned to the first user; and
when failing to allocate the currently idle voice channel to the first user, attempting to perform the attempting step to allocate the currently already-timed-out voice channel to the first user.

4. The method according to claim 3, wherein attempting to allocate the currently idle voice channel to the first user includes:
attempting to allocate to the first user a first currently idle voice channel that is assigned to a first voice room, wherein the first user is assigned in the first voice room.

5. The method according to claim 1, further including:
when writing the first voice data to the first voice channel, updating a first timestamp of the first voice channel;
when writing the first voice data to the second voice channel, updating a second timestamp of a second voice channel; or
when writing the first voice data to the third voice channel, updating a third timestamp of the third voice channel.

6. The method according to claim 1, wherein allocating the currently already-timed-out voice channel to the first user includes:

attempting to allocate to a first user a first currently already-timed-out voice channel that is assigned to a first voice room, wherein the first user is assigned in the first voice room.

7. A voice server comprising one or more processors, memory; and one or more program modules stored in the memory and to be executed by the one or more processors, the one or more program modules including:
a receiving module configured to receive first voice data;
a searching module configured to search for a first voice channel corresponding to a first user of the first voice data;
an allocating module configured, when the searching module fails to find the first voice channel corresponding to the first user, to attempt to allocate a currently already-timed-out voice channel to the first user;
a writing module configured, when the allocating module successfully allocates a second voice channel that is currently already-timed-out to the first user, to write the first voice data to the second voice channel and to mark the second voice channel as assigned to the first user, and to write the first voice data to the first voice channel when the searching module successfully finds the first voice channel corresponding to the first user; and
a channel re-setting module configured to, when a pre-determined channel re-setting condition is satisfied, re-set a currently already-timed-out portion of voice channels or all of voice channels as an idle voice channel;
wherein the channel re-setting module is further configured to re-set the currently already-timed-out portion of the voice channels or all of the voice channels as idle voice channels:
when a number of the currently idle voice channel is less than a preset first threshold value,
when the number of the currently idle voice channel has a ratio over a total number of the voice channel and the ratio is less than a preset second threshold value,
when a re-setting instruction for the currently already-timed-out voice channel is received,
when a preset re-setting cycle reaches,
when a number of the currently already-timed-out voice channel is greater than a preset third threshold value,
when the number of the currently already-timed-out voice channel has a ratio over a total number of the voice channel and the ratio is greater than a preset fourth threshold value, or
when a ratio of the number of the currently already-timed-out voice channel over the number of the currently idle voice channel is greater than a preset fifth threshold value.

8. The server according to claim 7, wherein:
the allocating module is further configured, when failing to find the first voice channel corresponding to the first user, to attempt to allocate a currently idle voice channel to the first user; and
the writing module is further configured, when successfully allocating to the first user a third voice channel that is currently idle, to write the first voice data to the third voice channel and to mark the third voice channel as assigned to the first user.

9. The server according to claim 7, wherein:
the allocating module is further configured, when the searching module fails to find the first voice channel corresponding to the first user, to attempt to allocate a currently idle voice channel to the first user, and when failing to allocate the currently idle voice channel to the first user, to attempt to perform the attempting step to allocate the currently already-timed-out voice channel to the first user, and the writing module is further configured, when the allocating module successfully allocates to the first user a third voice channel that is currently idle, to write the first voice data to the third voice channel and to mark the third voice channel as assigned to the first user.

10. The server according to claim 9, wherein the allocating module is further configured:
   when the searching module fails to find the first voice channel corresponding to the first user, to attempt to allocate to the first user a first currently idle voice channel that is assigned to a first voice room, and
   when failing to allocate the currently idle voice channel to the first user, to attempt to allocate a first currently already-timed-out voice channel that is assigned to the first voice room to the first user, wherein the first user is assigned in the first voice room.

11. The server according to claim 7, further including a timestamp updating module configured:
   when the writing module writes the first voice data to the first voice channel, to update a first timestamp of the first voice channel;
   when the writing module writes the first voice data to the second voice channel, to update a second timestamp of a second voice channel; or
   when the writing module writes the first voice data to the third voice channel, to update a third timestamp of the third voice channel.

12. A communication system comprising:
   a voice server interacting with a user terminal, wherein the voice server includes one or more processors, memory; and one or more program modules stored in the memory and to be executed by the one or more processors, and the voice server is configured:
   to receive first voice data sent from the user terminal;
   to search for a first voice channel corresponding to a first user of the first voice data;
   when failing to find the first voice channel corresponding to the first user, to attempt to allocate a currently already-timed-out voice channel to the first user;
   when successfully allocating a second voice channel that is currently already-timed-out to the first user, to write the first voice data to the second voice channel and to mark the second voice channel as assigned to the first user, wherein the user terminal is assigned to the first user;
   when successfully finding the first voice channel corresponding to the first user, to write the first voice data to the first voice channel; and
   when a pre-determined channel re-setting condition is satisfied, to re-set a currently already-timed-out portion of voice channels or all of voice channels as an idle voice channel;
   wherein the pre-determined channel re-setting condition includes:
      when a number of the currently idle voice channel is less than a preset first threshold value,
      when the number of the currently idle voice channel has a ration over a total number of the voice channel and the ratio is less than a preset second threshold value,
      when a re-setting instruction for the currently already-timed-out voice channel is received,
      when a preset re-setting cycle reaches,
      when a number of the currently already-timed-out voice channel is greater than a preset third threshold value,
      when the number of the currently already-timed-out voice channel has a ratio over a total number of the voice channel and the ratio is greater than a preset fourth threshold value, or
      when a ratio of the number of the currently already-timed-out voice channel over the number of the currently idle voice channel is greater than a preset fifth threshold value.

* * * * *